United States Patent
Kruger et al.

(10) Patent No.: US 9,879,435 B2
(45) Date of Patent: Jan. 30, 2018

(54) HEIGHT ADJUSTABLE FURNITURE PIECE

(71) Applicant: Teknion Limited, Toronto (CA)

(72) Inventors: Paul Fredrick Kruger, Toronto (CA); Adam Douglas Haworth Sinclair, Pickering (CA)

(73) Assignee: Teknion Limited, Toronto (CA)

( * ) Notice: Subject to any disclaimer, the term of this patent is extended or adjusted under 35 U.S.C. 154(b) by 0 days.

(21) Appl. No.: 15/177,694

(22) Filed: Jun. 9, 2016

(65) Prior Publication Data

US 2016/0362899 A1 Dec. 15, 2016

Related U.S. Application Data

(60) Provisional application No. 62/175,069, filed on Jun. 12, 2015.

(51) Int. Cl.
| | |
|---|---|
| *B66B 9/00* | (2006.01) |
| *E04F 19/08* | (2006.01) |
| *A47B 5/06* | (2006.01) |
| *A47B 46/00* | (2006.01) |
| *F16M 11/00* | (2006.01) |

(52) U.S. Cl.
CPC ............... *E04F 19/08* (2013.01); *A47B 5/06* (2013.01); *A47B 46/005* (2013.01); *F16M 11/00* (2013.01); *A47B 2200/0078* (2013.01); *A47B 2200/04* (2013.01)

(58) Field of Classification Search
CPC . E04F 19/08; F16M 11/00; A47B 2200/0078; A47B 5/06; A47B 46/005; A47B 2200/04
USPC ............................................ 52/29, 27, 36.1
See application file for complete search history.

(56) References Cited

U.S. PATENT DOCUMENTS

| | | | |
|---|---|---|---|
| 1,433,062 | A | 10/1922 | Bellamy |
| D77,982 | S | 3/1929 | Rocic |
| D134,806 | S | 1/1943 | Brown et al. |
| D182,245 | S | 3/1958 | Rabin |
| D323,777 | S | 2/1992 | Knox, III |
| D355,990 | S | 3/1995 | Vincelli |
| 5,819,670 | A * | 10/1998 | O'Connor ............... A47C 9/06 108/134 |
| 6,267,202 | B1 | 7/2001 | Nelson |
| D457,351 | S | 5/2002 | Zerman et al. |
| D495,337 | S | 8/2004 | Zerman et al. |

(Continued)

OTHER PUBLICATIONS

Linak, "Lifting Column DL17", retrieved from the Internet on Sep. 8, 2016, http://www.linak.com/products/lifting-columns.aspx?product=DL17.

*Primary Examiner* — Basil Katcheves
(74) *Attorney, Agent, or Firm* — Bereskin & Parr LLP/S.E.N.C.R.L., s.r.l.

(57) ABSTRACT

A height-adjustable furniture piece has a wall mounting plate configured to be secured to an interior wall, a frame, a first actuator secured to the wall mounting plate and to a wall-facing surface of the frame, and a display mount secured to a room-facing surface of the frame. A worksurface is secured to and extends outwardly from a lower portion of the frame. A single height-adjustable leg is secured to the worksurface to support the furniture piece on a floor surface. The height-adjustable leg has a second actuator. The first actuator and the second actuator are adapted to operate to raise and lower the frame and the worksurface relative to the floor surface.

15 Claims, 17 Drawing Sheets

(56) References Cited

U.S. PATENT DOCUMENTS

| | | |
|---|---|---|
| D553,892 S | 10/2007 | Lior |
| D631,735 S | 2/2011 | Johnson |
| D645,571 S | 9/2011 | Furseth et al. |
| 8,015,929 B2 | 9/2011 | Tyner |
| D657,600 S | 4/2012 | Beckner |
| D677,496 S | 3/2013 | Agati et al. |
| D681,973 S | 5/2013 | Gibbs |
| D686,384 S | 7/2013 | Fosburgh |
| D707,287 S | 6/2014 | Thomas |
| 9,133,974 B2 * | 9/2015 | Tholkes ............... F16M 11/046 |
| 9,232,855 B2 * | 1/2016 | Ergun ..................... A47B 9/02 |
| 9,279,537 B2 * | 3/2016 | Hung .................... F16M 11/18 |
| 2010/0223857 A1 * | 9/2010 | Sutton ................. A47B 46/005 52/27 |
| 2010/0308188 A1 * | 12/2010 | Jones ..................... A47B 21/02 248/207 |
| 2011/0283632 A1 * | 11/2011 | Sutton ................. A47B 46/005 52/36.1 |
| 2012/0199049 A1 | 8/2012 | Ruggiero |
| 2013/0314852 A1 | 11/2013 | Kincaid et al. |
| 2014/0034799 A1 * | 2/2014 | Fallows ............... F16M 11/046 248/297.21 |
| 2014/0191641 A1 * | 7/2014 | Marsters ............... A47B 46/00 312/246 |
| 2016/0073779 A1 * | 3/2016 | Ringlein ............. A47B 87/002 108/28 |
| 2016/0170402 A1 * | 6/2016 | Lindstrom ............... A47B 9/00 700/275 |

* cited by examiner

HEIGHT ADJUSTABLE FURNITURE PIECE

FIELD OF THE INVENTION

This application relates generally to a height-adjustable furniture piece, and more specifically to a height-adjustable workstation for installation to an interior wall.

INTRODUCTION

Height-adjustable workstations are well known. Such systems are commonly used, for example, in office buildings or in home offices.

Often, height-adjustable workstations are free-standing, and many designs include two or more actuators secured to the underside of the worksurface. While such height-adjustable workstations may be placed against an interior wall, they are not typically mounted or otherwise secured to interior walls.

SUMMARY

The following summary is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided a height-adjustable furniture piece for installation to an interior wall, the height-adjustable furniture piece comprising: a wall mounting plate configured to be removably secured to the interior wall; a display frame; a first actuator secured to the wall mounting plate and to a wall-facing surface of the display frame; a display mount secured to a room-facing surface of the display frame; a worksurface secured to and extending outwardly from a lower portion of the display frame; and a height-adjustable leg secured to the worksurface for supporting the furniture piece on a floor surface, the height-adjustable leg comprising a second actuator; wherein the first actuator and the second actuator are adapted to operate to raise and lower the display frame and the worksurface relative to the floor surface.

In some embodiments, the interior wall has at least two studs and a finished surface, the wall mounting plate has a plurality of fastener bores therein, and the wall mounting plate is configured to be secured to the at least two studs by inserting fasteners through the fastener bores; wherein a portion of the wall mounting plate is the only element of the furniture piece that extends through the finished surface of the interior wall.

In some embodiments, the first actuator comprises a spaced-apart pair of actuators arranged in parallel.

In some embodiments, the height-adjustable furniture piece further comprises a panel having at least one input device operable to selectively operate the first actuator and the second actuator in response to a received input. In some embodiments, the panel is located proximate the lower portion of the display frame. In some embodiments, the panel further comprises at least one electrical input socket and at least one electrical output socket.

In some embodiments, the display mount is configured to be secured to and support a display in a plurality of orientations.

In another broad aspect, there is provided a display mount comprising: a rear panel configured to be secured to a mounting surface, the rear panel having a pair of spaced-apart sides; a pair of rear side panels, each rear side panel having first and second spaced-apart sides, the first side of one of the rear side panels being pivotally coupled to one of the sides of the rear panel, the first side of the other rear side panel being pivotally coupled to the other side of the rear panel; a pair of front side panels, each front side panel having first and second spaced-apart sides, the first side of one of the front side panels being pivotally coupled to the second side of one of the rear side panels, the first side of the other front side panel being pivotally coupled to the second side of the other rear side panel; and a front panel configured to be secured to a display, the front panel having a pair of spaced-apart sides, one of the sides of the front panel being pivotally coupled to the second side of one of the front side panels, the other side of the front panel being pivotally coupled to the second side of the other front side panel.

In some embodiments, the first side of each rear side panel comprises a leading edge, upper and lower edge portions recessed inwardly from the leading edge, and a vertical base bore positioned between the leading edge and each edge portion; each side of the rear panel comprises a leading edge, and upper and lower flanges extending outwardly from the leading edge, each flange having a vertical barrel bore extending therethrough; and the first sides of each rear side panel are pivotally coupled to the sides of the rear panel using pivot pins, each pivot pin having a first end configured to be secured in one of the base bores and a second end configured to be pivotally located in one of the barrel bores.

In some embodiments, the second side of each rear side panel comprises a leading edge, upper and lower flanges extending outwardly from the leading edge, each flange having a vertical barrel bore extending therethrough; the first side of each front side panel comprises a leading edge, upper and lower edge portions recessed inwardly from the leading edge, and a vertical base bore positioned between the leading edge and each edge portion; and the second sides of each rear side panel are pivotally coupled to the first sides of the front side panels using pivot pins.

In some embodiments, the second side of each front side panel comprises a leading edge, upper and lower flanges extending outwardly from the leading edge, each flange having a vertical barrel bore extending therethrough; each side of the front panel comprises a leading edge, upper and lower edge portions recessed inwardly from the leading edge, and a vertical base bore positioned between the leading edge and each edge portion; and the second sides of each front side panel are pivotally coupled to the sides of the front panel using pivot pins.

In some embodiments, each pivotal coupling further comprises a bushing disposed about the pivot pin and between the vertical bores.

In some embodiments, each of the rear side panels and the front side panels have the same dimensions.

In some embodiments, the display mount further comprises a display plate configured for securement between the front panel and at least a display of a first size and a display of a second size.

In another broad aspect, there is provided a linear actuator for use in a height-adjustable furniture piece, the linear actuator comprising: an actuator frame having a frame base, a first end and a second end, and a track extending between the first end and the second end; a threaded shaft extending between and rotationally supported at the first and second ends, the threaded shaft being offset to one side of the track and being substantially parallel to the track, the threaded shaft having an axis of rotation; a sled configured to translate along and be guided by the track, the sled having a mounting flange extending away from the frame base, and a plurality of roller members for rollingly supporting the sled in the track, each roller member having an axis of rotation; wherein the axes of rotation of the roller members are offset from the frame base by a first distance, the axis of rotation of the threaded shaft is offset from the frame base by a second distance, and the second distance is greater than the first distance; a ballscrew mounted on the threaded shaft and secured to the sled, whereby rotation of the threaded shaft in a first direction results in the ballscrew and sled translating towards the first end, and rotation of the threaded shaft in a second direction results in the ballscrew and sled translating towards the second end; and a motor secured to the first end and configured to selectively rotate the threaded shaft.

In some embodiments, the track comprises a pair of L-shaped flanges extending from the frame base, each flange defining a channel between the frame base and the flange, and wherein the roller members are positioned in the channels.

In some embodiments, the L-shaped flanges face each other such that a sled gap is defined between the channels, wherein the sled comprises a roller flange positioned in the sled gap, and wherein at least one of the plurality of roller members extends outwardly from one side of the roller flange towards one of the channels, and at least another one of the plurality of roller members extends outwardly from the other side of the roller flange towards the other of the channels.

In some embodiments, the first and second ends of the actuator frame extend from the frame base by an actuator frame distance, and wherein the mounting flange is the only component between the first and second ends that is positioned a greater distance from the frame base than the actuator frame distance.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

The drawings included herewith are for illustrating various examples of articles, methods, and apparatuses of the teaching of the present specification and are not intended to limit the scope of what is taught in any way.

DETAILED DESCRIPTION

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Figure 1:
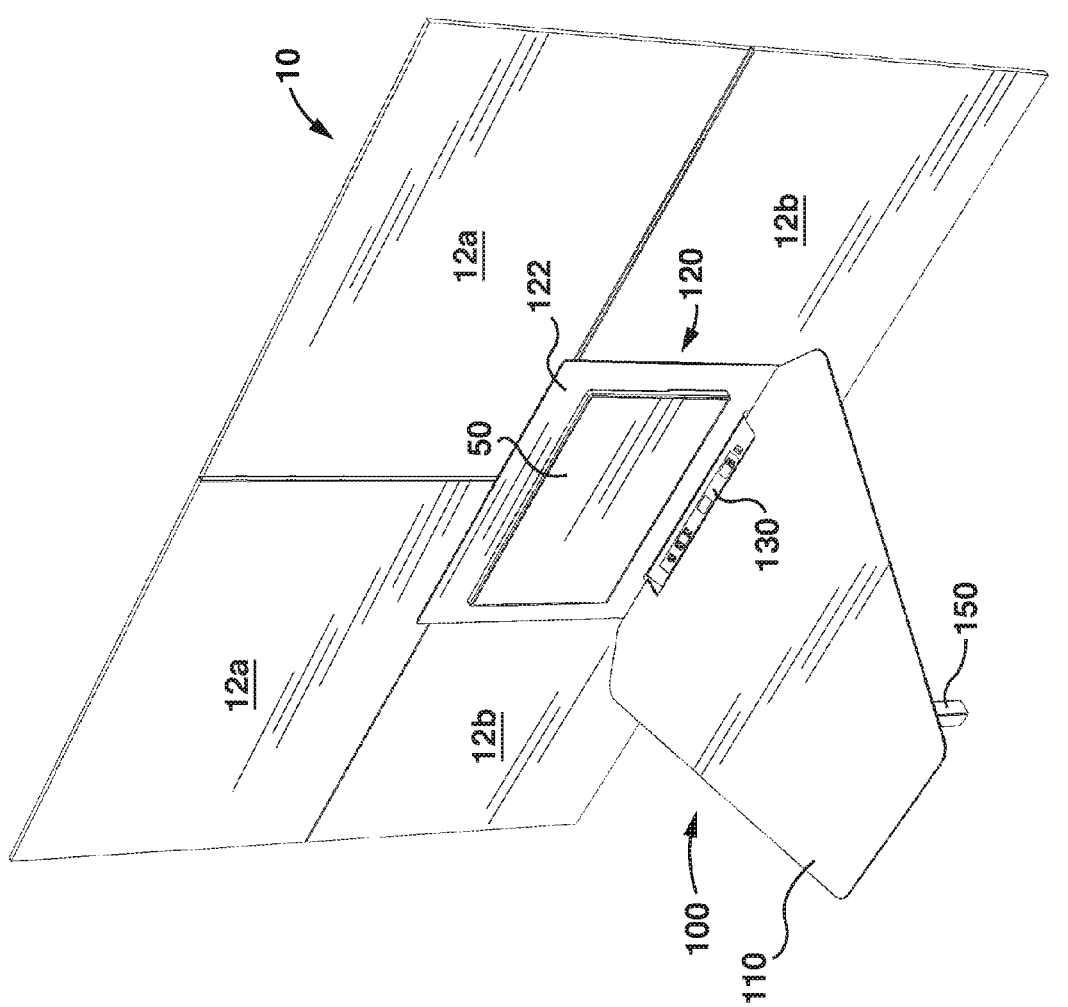
FIG. 1 is a perspective view of an exemplary height-adjustable furniture piece secured to an interior wall.

FIG. 1 shows a height-adjustable furniture piece (which may also be referred to as a height-adjustable workstation), referred to generally as 100, positioned against a wall 10. Height-adjustable workstation 100 may be used within an individual's office, in a shared workspace, or in a common area (e.g. a lobby, a retail environment).

The wall 10 is secured to the floor, and preferably to the ceiling, of the building. Wall 10 may be a load-bearing wall or a non-load bearing wall, such as a partition wall within an office. For example, wall 10 may be a demising wall including one or more finish panels 12.

Figure 2:
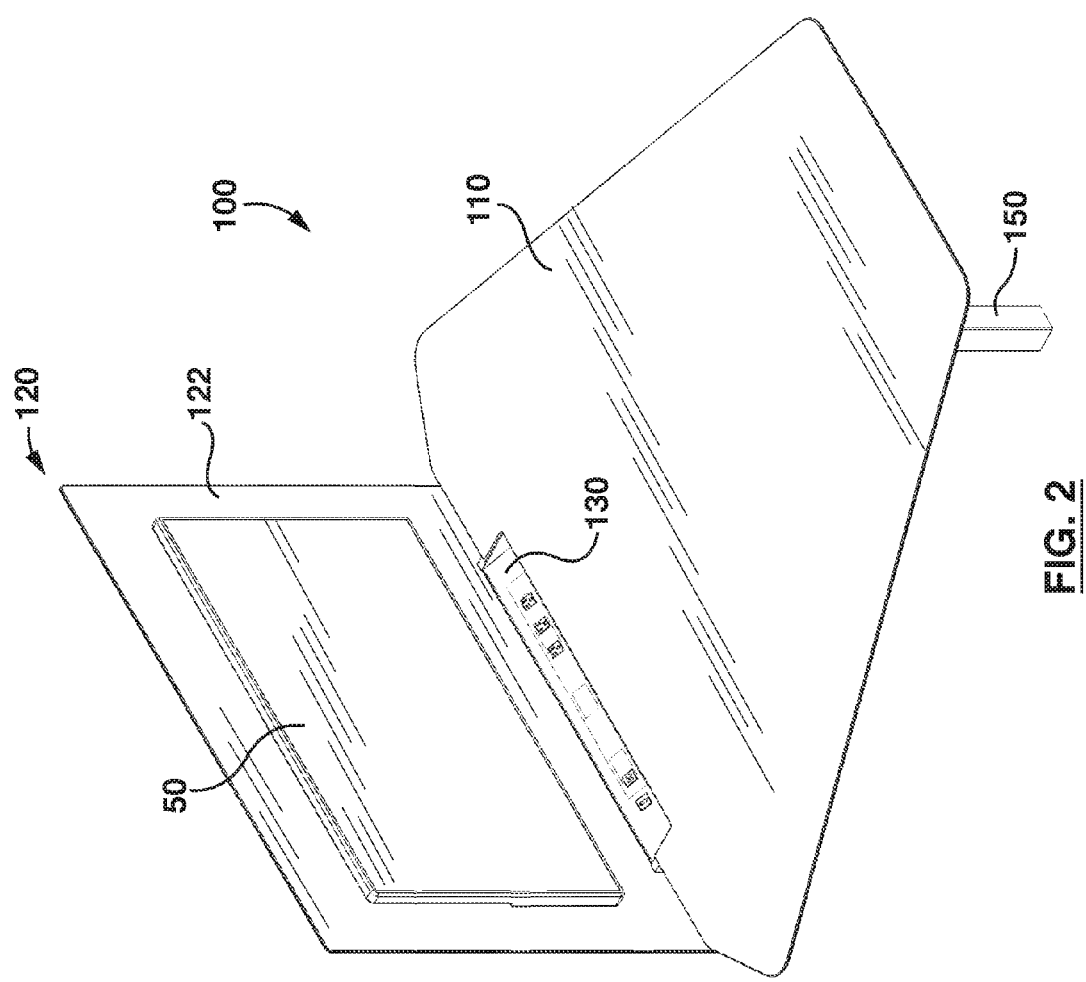
FIG. 2 is a perspective view of the height-adjustable furniture piece.

Referring to FIGS. 1 and 2, workstation 100 includes a worksurface 110, a display frame 120 on which a display 50 may be mounted, and a height-adjustable leg 150. The height-adjustable leg 150 is secured to the underside of the worksurface 110, and assists in supporting the workstation above a floor surface. The display frame is secured to the wall 10, and also assists in supporting the workstation above a floor surface.

Figure 3:
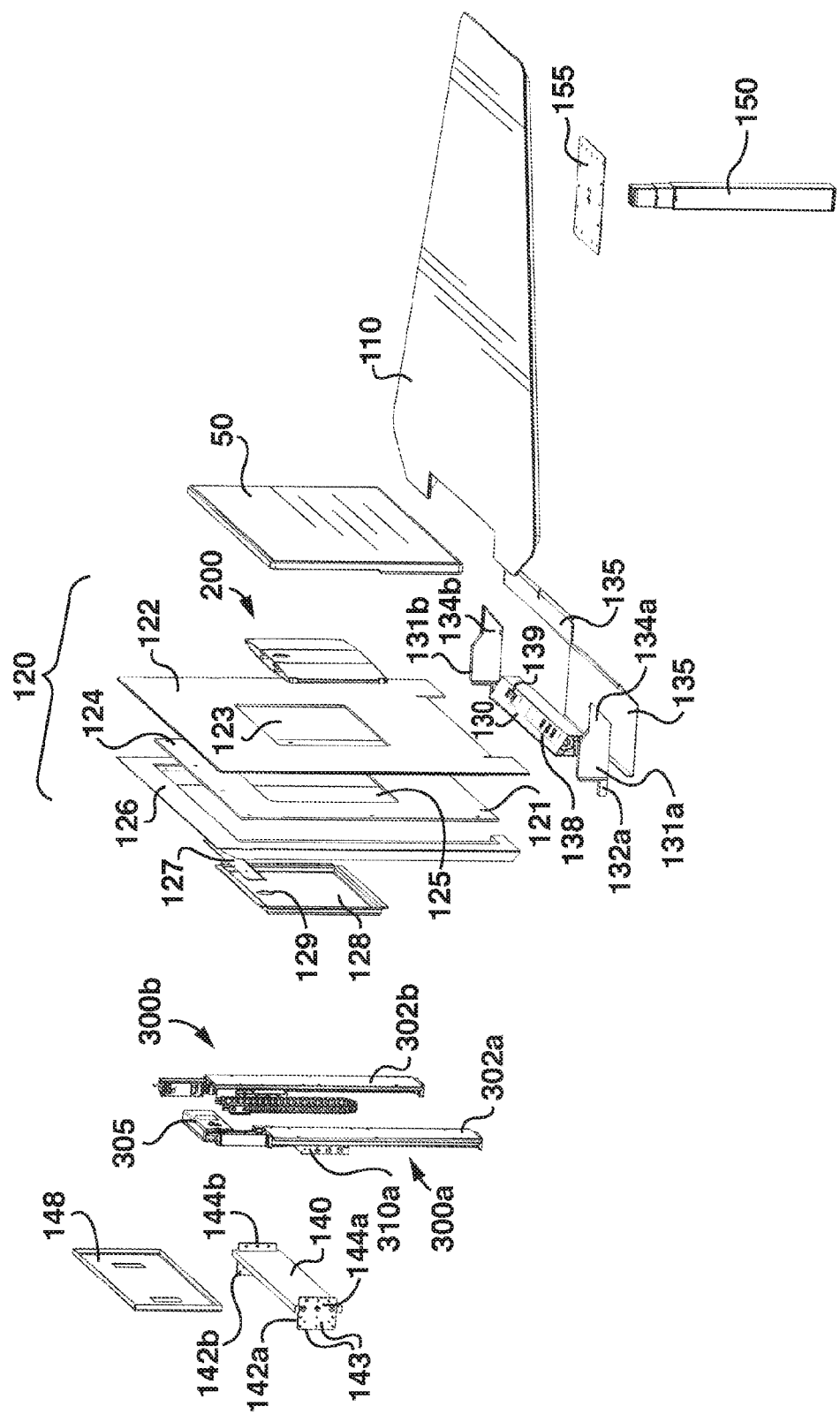
FIG. 3 is an exploded perspective view of the height-adjustable furniture piece.
Figure 4:
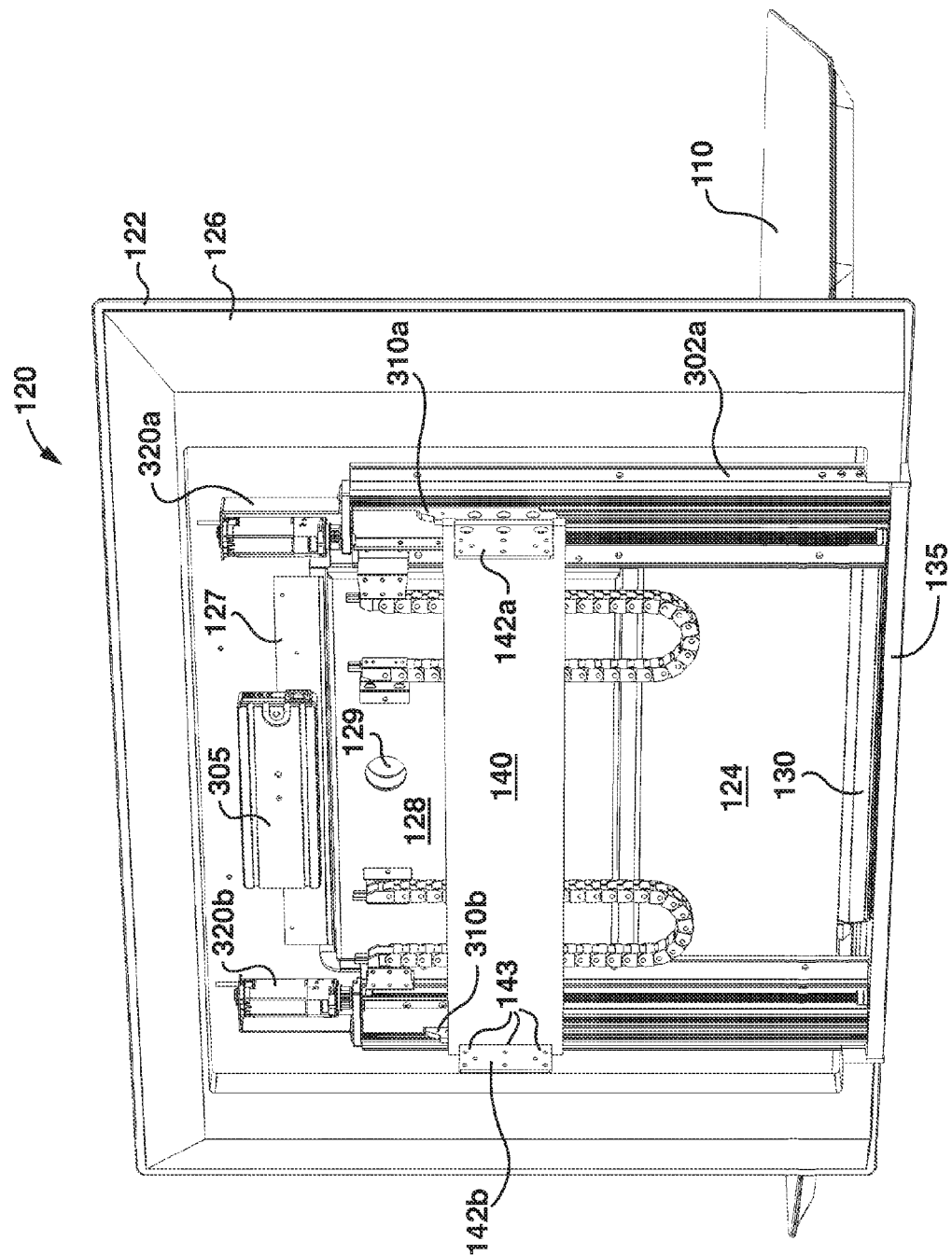
FIG. 4 is a rear view of the height-adjustable furniture piece.
Figure 5:
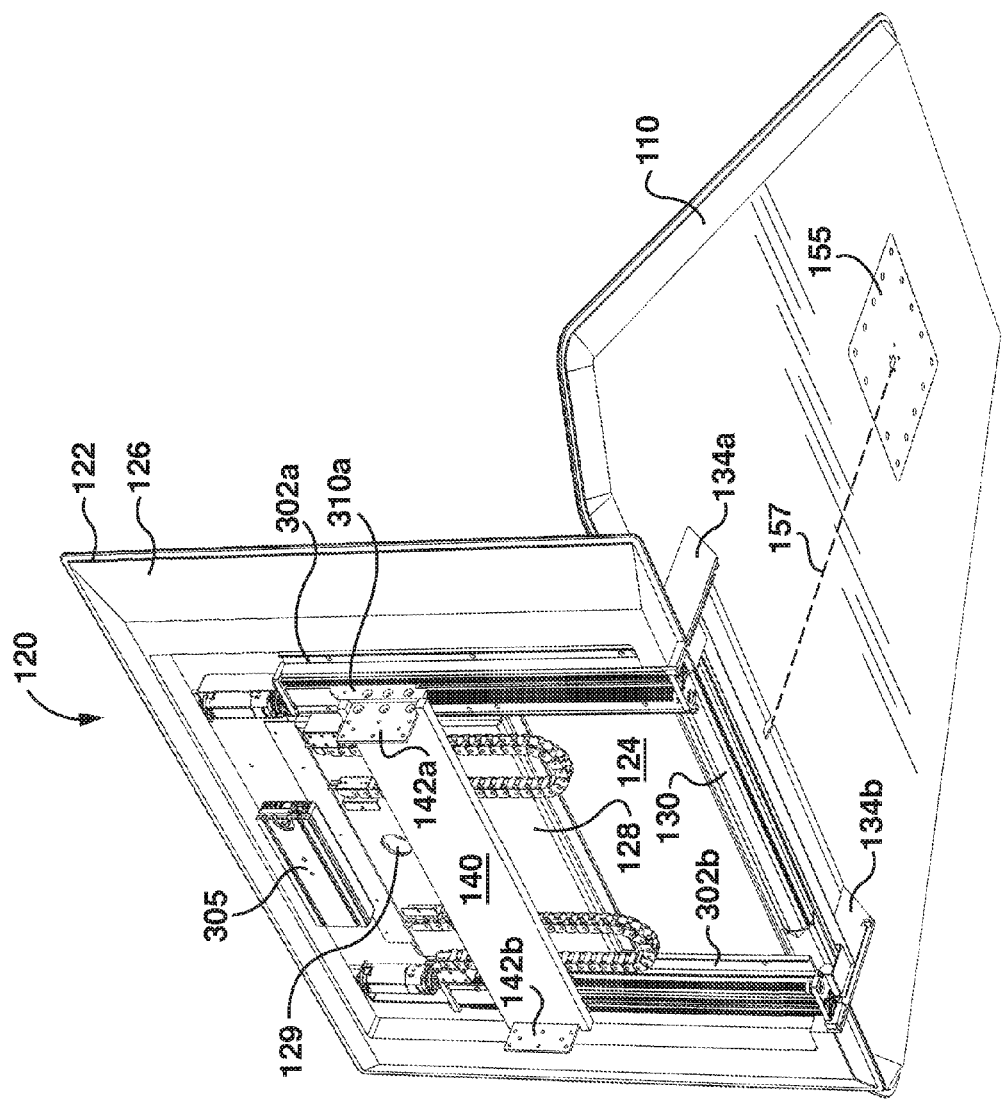
FIG. 5 is a rear perspective view showing a bottom portion of the height-adjustable furniture piece.
Figure 6:
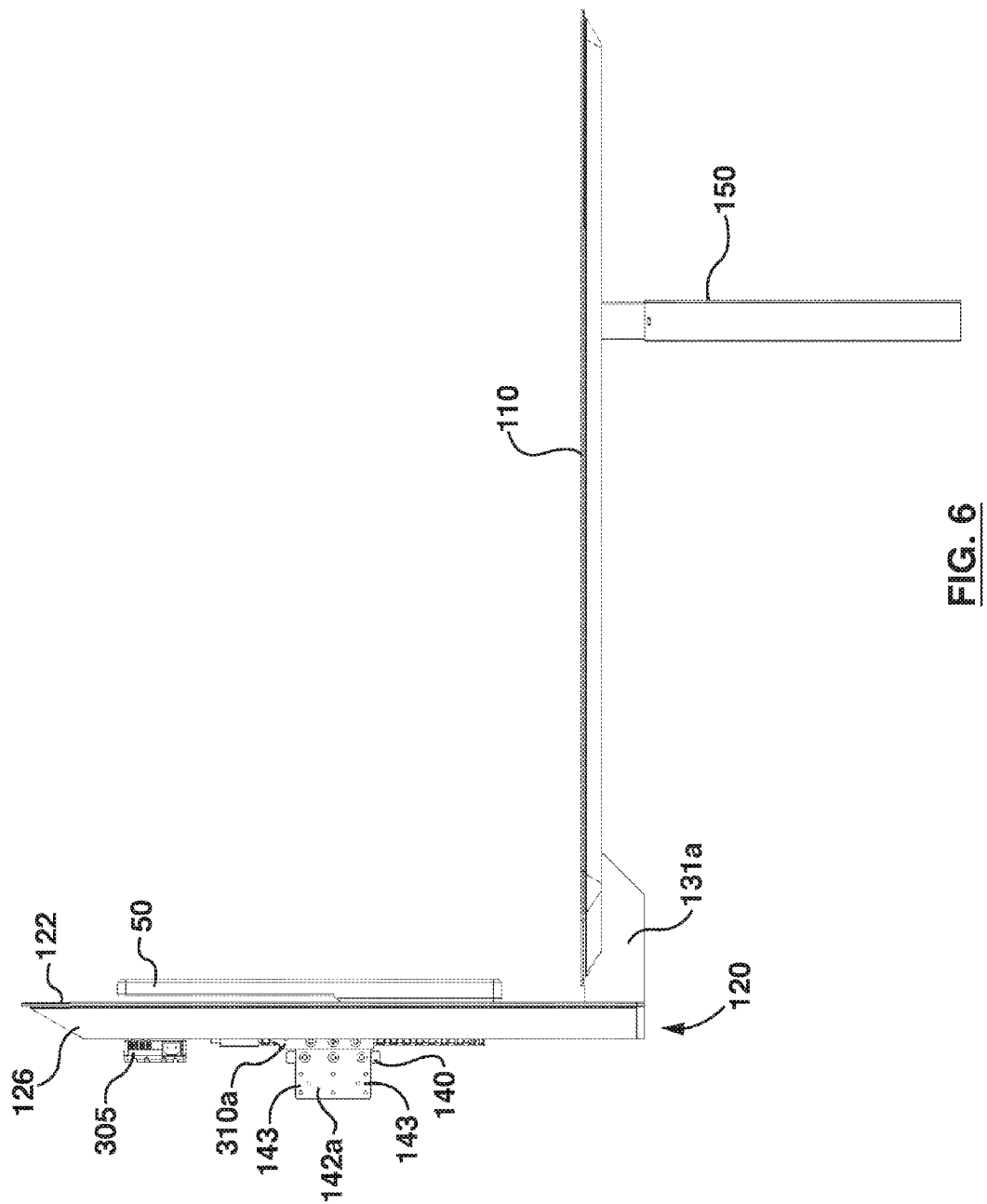
FIG. 6 is a side view of the height-adjustable furniture piece.

Referring now to FIGS. 3 to 5, the height-adjustable furniture piece 100 also includes a wall mounting plate 140, which is used to secure the furniture piece 100 to the wall 10.

In the illustrated example, wall mounting plate 140 has a pair of rear flanges 142a,b that extend from the wall mounting plate 140 towards the wall 10. Each rear flange 142 has one or more fastener bores 143 extending therethrough. In use, mechanical fasteners (e.g. screws, bolts, and the like) are inserted through the fastener bores 143 for securing the wall mounting plate 140 to a wall, for example as shown in FIG. 7, in which rear flange 142a is secured to a riser 14 of wall 10.

Wall mounting plate 140 also has a pair of front flanges 144a,b that extend from the mounting plate 140 and towards the display frame 120. Front flanges 144a,b are used to secure the wall mounting plate to actuators 300a,b. Each front flange 144 has one or more fastener bores 145 extending therethrough. In use, mechanical fasteners (e.g. screws, bolts, and the like) are inserted through the fastener bores 145 for securing the wall mounting plate 140 to the actuators. In the illustrated example, rear flanges 142 and front flanges 144 are integrally formed, although it will be appreciated that the flanges can be formed in any other suitable fashion.

In the illustrated example, each actuator 300 includes an actuator frame 302 which is secured to frame 120, and an actuator mounting flange 310 that, in use, translates vertically relative to the actuator frame 302 when driven by the actuator motor 320. The front flanges 144a,b of the wall mounting plate 140 are secured to actuator flanges 310a,b, respectively, for example, using one or more mechanical fasteners. Accordingly, when the wall mounting plate 140 is secured to a wall 10 and to the actuator flanges 310, and the actuator frame is secured to the display frame 120, the display frame 120 can be raised and lowered vertically relative to the wall by the actuators 300 (i.e. by translating the actuator mounting flange 310 relative to the actuator frame 302). While a pair of actuators 300a,b are shown, it will be appreciated that more of fewer actuators may be used in variant embodiments.

Figure 7:
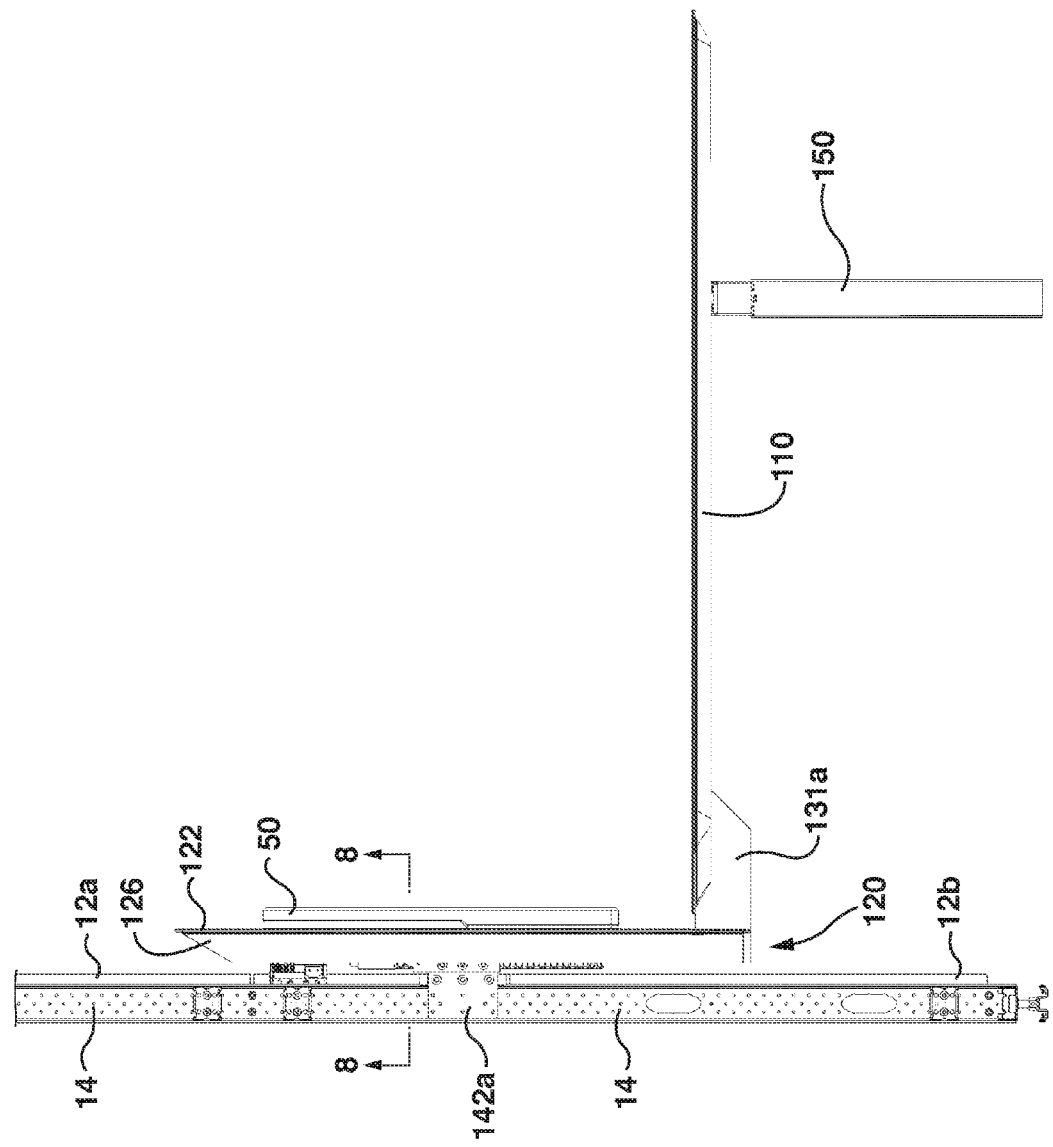
FIG. 7 is a side view of the height-adjustable furniture piece secured to an interior wall, with the wall shown in cross section.
Figure 8:
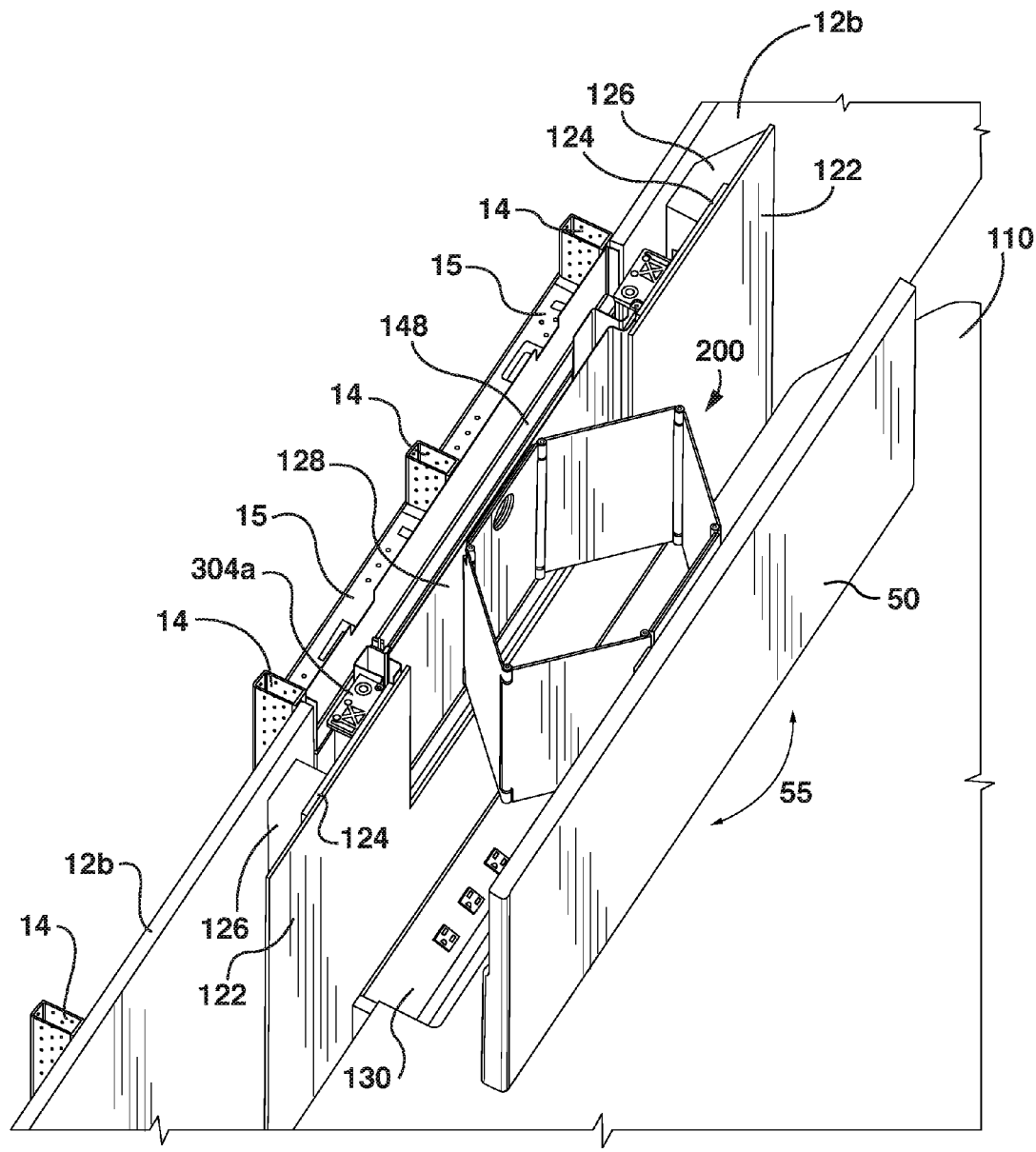
FIG. 8 is a top perspective cross-section view along the line 8-8 shown in FIG. 7.

As perhaps best seen in FIGS. 7 and 8, one aspect of the illustrated wall mounting system is that the wall mounting plate 140 (and more specifically, rear flanges 142a,b) is preferably the only element of furniture piece 100 that extends through the finished surface (e.g. finish panels 12a and 12b) of the interior wall. Put another way, with the exception of wall mounting flanges 142, workstation 100 is preferably not recessed into wall 10. Such an arrangement may have one or more advantages. For example, workstation 100 may have a reduced (or minimal) impact on any noise insulating treatment incorporated into wall 10. Also, this mounting arrangement may result in wall 10 having a 'cleaner' (i.e. aesthetically more pleasing) look, e.g. due to the lack of recesses and/or reveals associated with workstation 100 and/or actuators 300. Also, such a mounting system may facilitate the de-installation of workstation 100 from a wall, thus allowing workstation 100 to be characterized as a modular furniture piece that can be reinstalled in another location, as opposed to a permanent fixture that must remain in the place where it is installed until it is demolished.

Returning to FIG. 3, in the illustrated example display frame 120 includes a number of components, including a first support frame 124 having an aperture 125, and a second support frame 128 secured to the first support frame such that it is accessible through aperture 125. Second support frame 128 has an aperture 129, through which cabling for a display 50 can be disposed.

Display frame 120 also includes a rear shroud 126 secured to the wall-facing side of first support frame 124. Rear shroud 126 extends towards the wall, and in use prevents other components secured to the rear of first support frame 124 (e.g. actuators 300, cabling) from being seen, which may improve the aesthetic appearance of the furniture piece 100.

Optionally, one or more further panels or guides may be provided on the wall facing side of first support frame 124. For example, as shown in FIG. 3, a cable management panel 148 may be provided to prevent cables from interfering with each other and/or with components of furniture piece 100, e.g. during raising and/or lowering of furniture piece 100 relative to wall 10.

Display frame 120 also includes a front panel 122 secured to the room-facing side of first support frame 124. Front panel 122 has an aperture 123 that is aligned with aperture 125 of first support frame 124. In use, front panel 122 prevents the first support frame 124 from being seen, which may improve the aesthetic appearance of the furniture piece 100.

Also shown in FIG. 3 is a display mount 200, which is used to mount a display 50 to display frame 120. In the illustrated example, display mount 200 is secured to the room-facing side of second support frame 128. Display mount 200 will be discussed further below.

Also secured to display frame 120 is worksurface 110. These components may be secured to each other in any suitable manner known in the art. In the illustrated example, worksurface 110 is secured to using a pair of worksurface mounting members 131a,b. As seen in FIG. 3, each worksurface mounting member 131 has a rear tab 132 that mates with a corresponding slot 121 in a lower portion of first support frame 124, and a front flange 134 that is secured to an underside of worksurface 110.

As shown in FIGS. 3 and 4, one or more shrouds 135 may optionally be provided on the underside of the worksurface to hide e.g. mounting components or cables from view, which may improve the aesthetic appearance of the furniture piece 100.

Preferably, a control panel 130 is provided at (or near) the juncture of worksurface 110 and display frame 120. Control panel has one or more user input devices 138 (such as buttons, switches, rockers, touchscreens, and the like) provided thereon that allow a user to selectively control (e.g. raise and lower) the motion of furniture piece 100.

Optionally, control panel 130 has one or more electrical connectors 139. Electrical connectors may include output sockets (such as power sockets, data sockets (e.g. display output sockets), and the like) and/or input sockets, such as display input sockets (e.g. HDMI and/or DisplayPort sockets), data input sockets (e.g. USB or SD sockets), and the like. For example, input sockets may be used to connect a mobile communication device, such as a laptop computer, to display 50.

As shown in FIGS. 3 and 5, a height-adjustable leg 150 is secured to the underside of the worksurface 110. In the illustrated example, a leg mounting plate 155 is used to secure the leg 150 to the worksurface 110, although any suitable alternative securement method may be used.

Preferably, height-adjustable leg 150 includes an actuator for selectively extending and retracting leg 150 in the vertical direction. In the illustrated example, leg 150 is a telescopic leg with an actuator positioned interior of the leg, and the leg actuator is therefore not shown in the Figures. An example of a suitable height-adjustable leg 150 is a DL17 Lifting Column, available from LINAK of Denmark.

As shown schematically by dashed line 157 in FIG. 5, control and/or power cable is preferably run between the leg 150 and the actuator control module 305 and/or user input devices 138. In some embodiments, the cabling may be run interior of worksurface 110, which may prevent damage to the cabling and/or improve the aesthetic appearance of the furniture piece 100.

Preferably, actuators 300 and the leg actuator are configured to operate concurrently to raise and lower the workstation 100 relative to wall 10. For example, in response to a user request to raise the workstation 100, actuators 300a,b may translate actuator mounting flanges 310a,b relative to the actuator frame 302 to raise the display frame relative to the wall 10, while the leg actuator simultaneously extends leg 150 to raise the worksurface 110 relative to the floor surface.

The user request to raise or lower the workstation 100 may be received via the user input devices 138. Alternatively, actuator control module 305 may be accessible over a wired or wireless computer network, or via a short-range communication network (e.g. a Bluetooth network), allowing a user to control the operation via a computing device, such as a smart phone or other mobile communication device, that is not physically connected to workstation 100.

Display Mount

Figure 9:
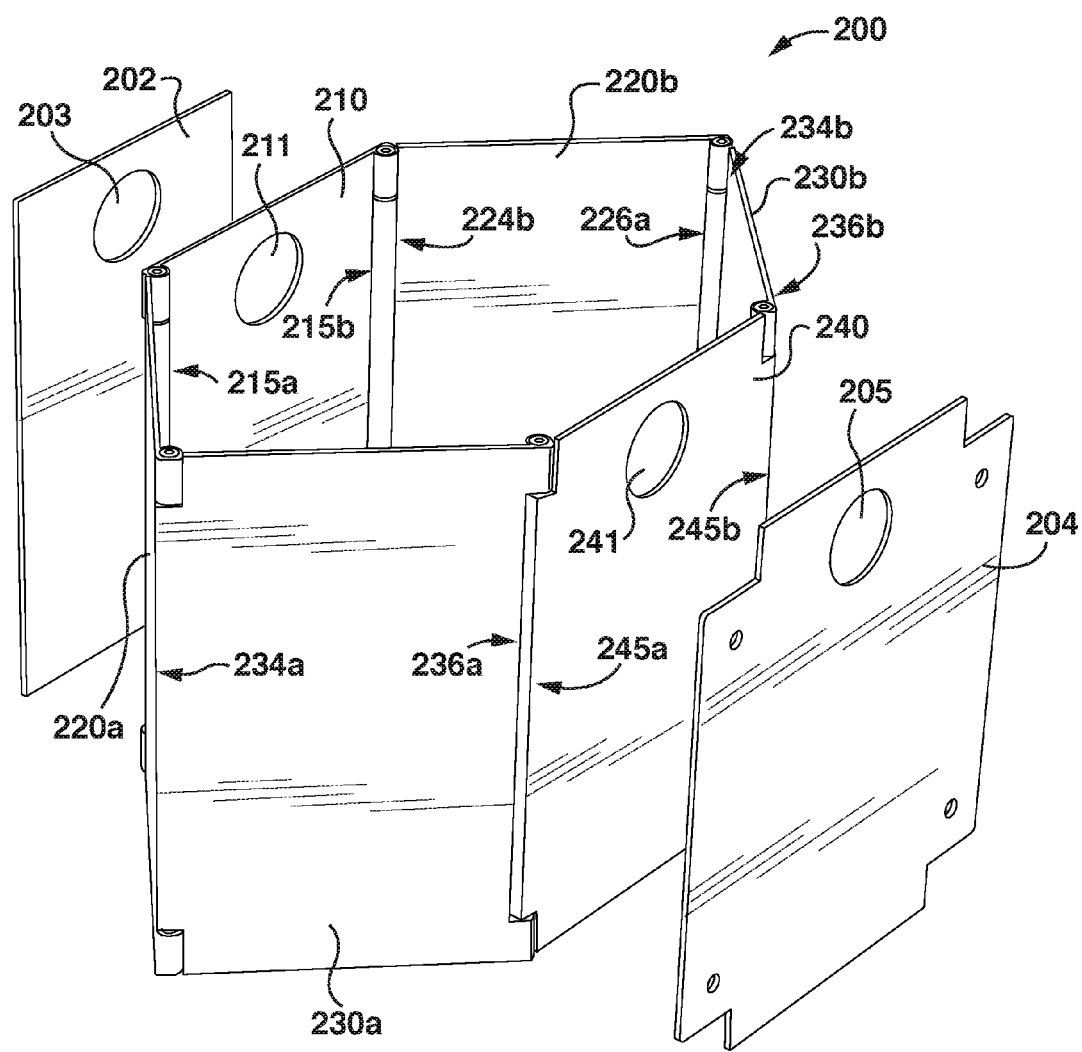
FIG. 9 is a perspective view of an exemplary display mount.

Referring to FIG. 9, an example display mount, referred to generally as 200, may be used to secure a display 50 to display frame 120 of workstation 100. Display mount 200 allows display 50 to be selectively oriented relative to display frame 120. For example, as shown by arrow 55 in FIG. 8, display mount 200 allows a display 50 to be articulated through a range of about 30° relative to display frame 120. Additional examples of the articulation of display mount 200 are shown in FIGS. 11A-D.

As shown in FIG. 9, display mount 200 includes a rear panel 210. Rear panel 210 has a pair of opposed, spaced-apart sides 215a and 215b. Rear panel 210 also has an aperture 211 for routing one or more cables associated with display 50 through display mount 200.

A pair of rear side panels 220a,b are pivotally coupled to the sides 215a,b of rear panel 210. More specifically, a first side 224a of rear side panel 220a is pivotally coupled to side 215a of rear panel 210, and a first side 224b of rear side panel 220b is pivotally coupled to side 215b of rear panel 210.

A pair of front side panels 230a,b are pivotally coupled to the rear side panels 220a,b. More specifically, a first side 234a of front side panel 230a is pivotally coupled to a second side 226a of rear side panel 220a, and a first side 234b of front side panel 230b is pivotally coupled to a second side 226b of rear side panel 220b.

Display mount 200 also includes a front panel 240. Front panel 240 has a pair of opposed, spaced-apart sides 245a and 245b. Front panel 240 is pivotally coupled to front side panels 230a,b. More specifically, a second side 236a of front side panel 230a is pivotally coupled to side 245a of front panel 240, and a second side 236b of front side panel 230b is pivotally coupled to side 245b of front panel 240.

Figure 10A:
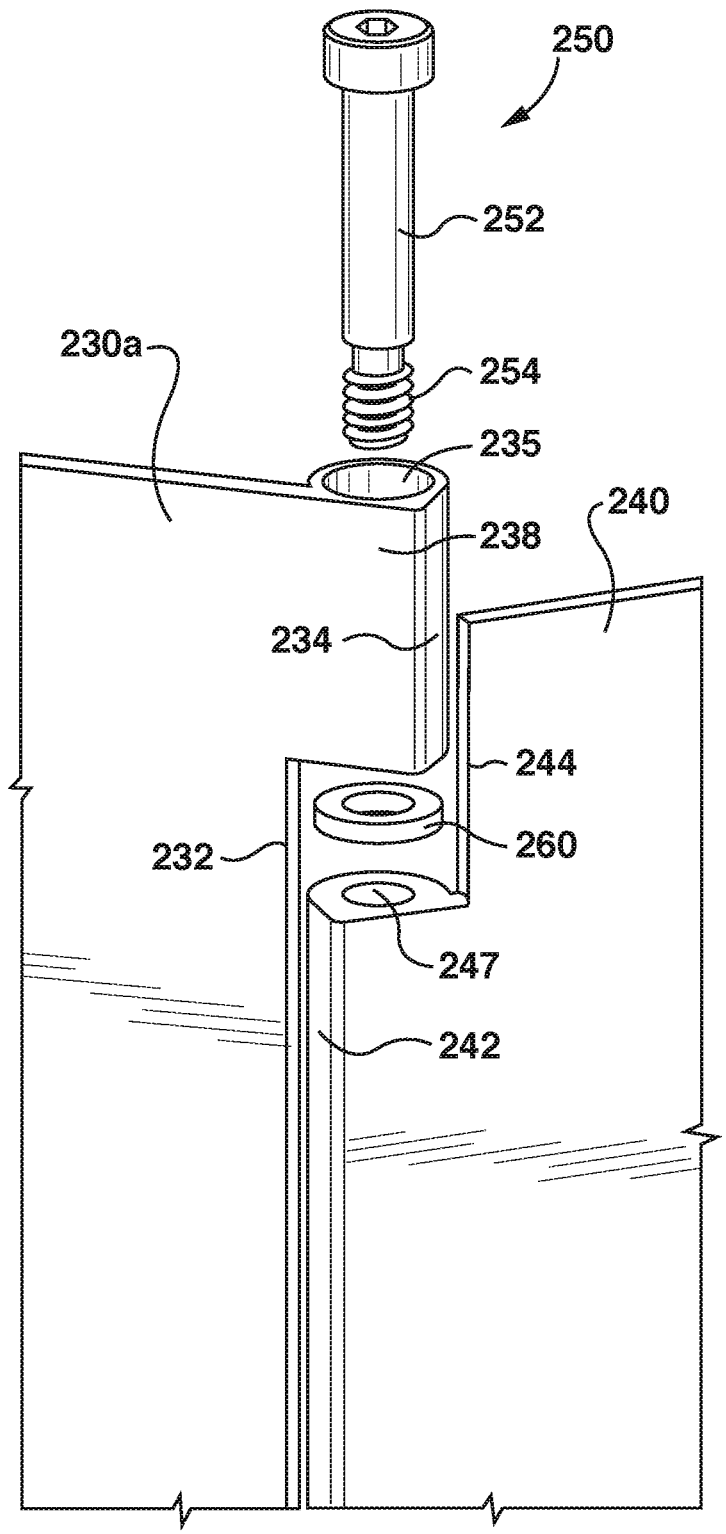
FIG. 10A is a an exploded perspective view of the pivotal connection outlined by circle A in FIG. 9.

The panels of display mount 200 may be pivotally coupled to one another in any suitable fashion. For example, as shown in FIG. 10A, the second side 236a of front side panel 230a has a principal edge 232. A flange 238 extends outwardly from edge 232, and flange 238 has a vertical bore 235 extending substantially parallel to edge 232 and positioned between edge 232 and an outer edge 234 of flange 238. Side 245a of front panel 240 has a principal edge 242. An edge portion 244 is recessed inwardly from edge 242, and a vertical bore 247 is positioned between edges 242 and 244, and extends substantially parallel to edge 242. A pivot pin 250 may then be inserted through bore 235 and a first end 254 may be secured in bore 247. In use, bore 235 rotates about second end 252 of pivot pin 250, allowing front side panel 230a to be pivoted relative to front panel 240.

While in the illustrated example first end 254 of pivot pin 250 is threaded for securement in a correspondingly threaded bore 247, it will be appreciated that other methods of securement (e.g. a press fit) may be used.

Optionally, one or more bearings or bushings 260 may be provided about pivot pin 250 and between a lower surface of flange 238 and an upper surface of edge 242 to provide a predetermined amount of friction between the panels, thereby controlling the amount of force needed to articulate the display mount.

A similar arrangement to that shown in FIG. 10A may be used to pivotally couple the second side 236b of front side panel 230b to side 245b of front panel 240, to pivotally couple second sides 226a,b to first sides 234a,b, and to pivotally couple sides 215a,b of rear panel 210 to first sides 224a,b.

Notably, in such an arrangement the rear, side, and front panels 210, 220, 230, and 240 may have the same width and cross-sectional profile, which may simplify the manufacture of display mount 200. For example, a single profile may be extruded, and the corners of such a profile may be machined to form either front, rear, or side panels.

Figure 10C:
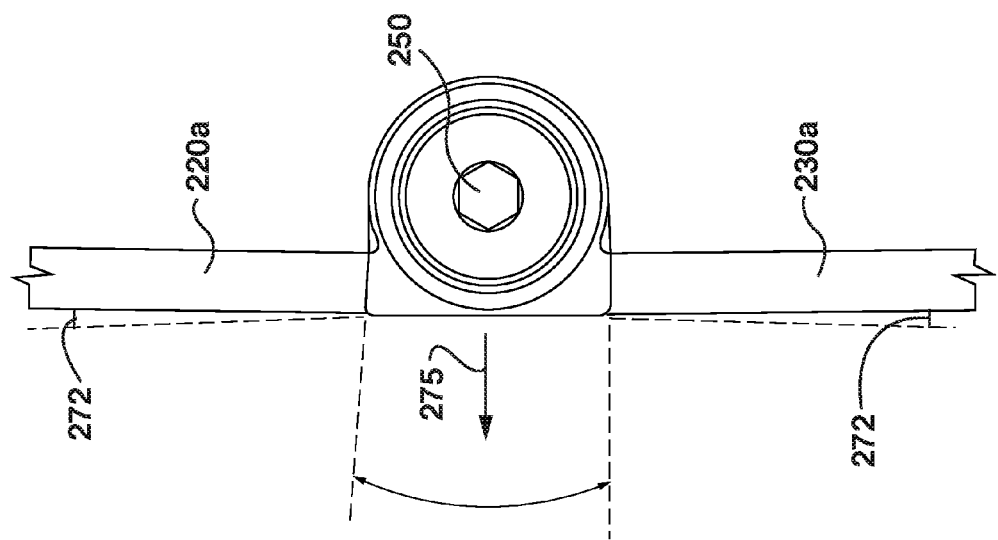
FIG. 10C is a top plan view of a pivotal connection.
Figure 10B:
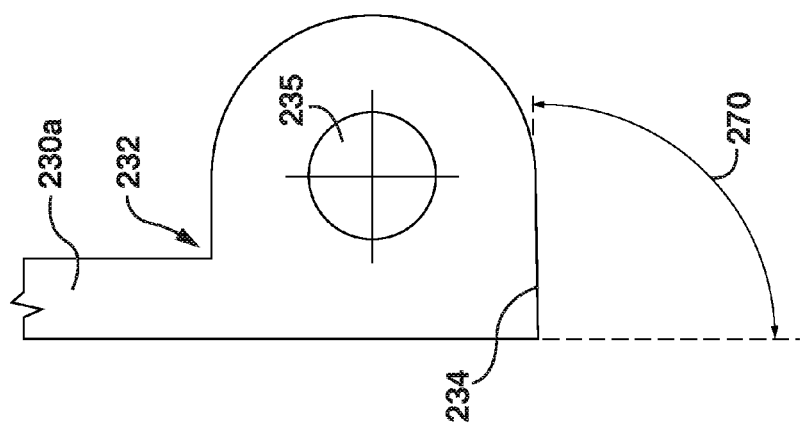
FIG. 10B is a top plan view of a side of a display mount panel.
Figure 11B:
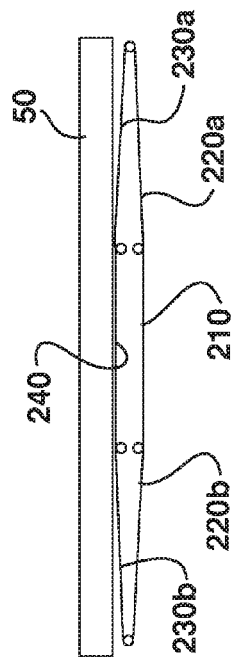
FIGS. 11A-11D are top schematic views of the display mount in various orientations.
Figure 11D:
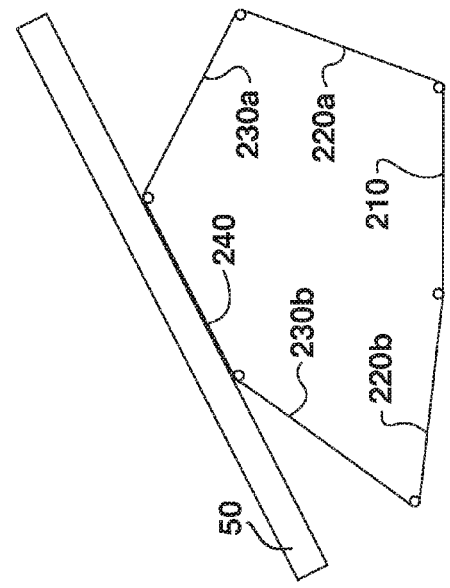
Figure 11A:
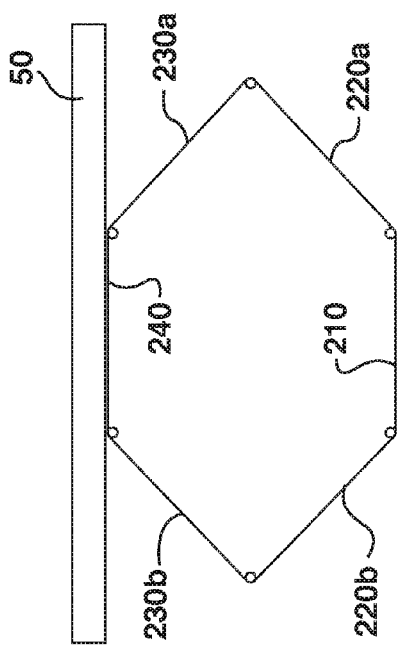
Figure 11C:
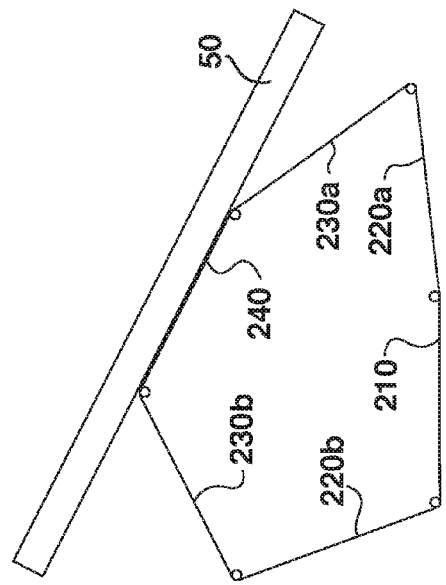

An 'anti-jackknifing' feature is preferably provided for rear, side, and front panels 210, 220, 230, and 240. For example, as shown in FIG. 10B, the side edges of the panels (illustrated here with respect to edge 234 of front side panel 230a) may have a slight shoulder or rounding. In other words, the angle 270 is greater than 90°, and preferably about 92°. As shown in FIG. 10C, this shoulder prevents the panel joints from 'locking out' or becoming fully straightened. That is, the panels will remain at least at an angle shown as 272 with respect to each other. Accordingly, when a force is applied towards the joint via e.g. panel 230a, the joint will tend to deflect in the direction of the arrow 275.

Optionally, display mount 200 may include a rear spacing or adapter plate 202 to assist in securing display mount to a fixed structure (e.g. to support frame 128 of display frame 120). Adapter plate 202 preferably has a bore 203 aligned with bore 211 to facilitate cable routing.

Alternatively, or additionally, display mount 200 may include a front spacing or adapter plate 204 to assist in securing a display 50 to display mount 200. For example, adapter plate 204 may be adapted to be secured to a rear panel of a display 50 in accordance with one or more display mounting standards, such as a VESA standard. Adapter plate 204 preferably has a bore 205 aligned with bore 241 to facilitate cable routing.

Linear Actuator

Figure 12:
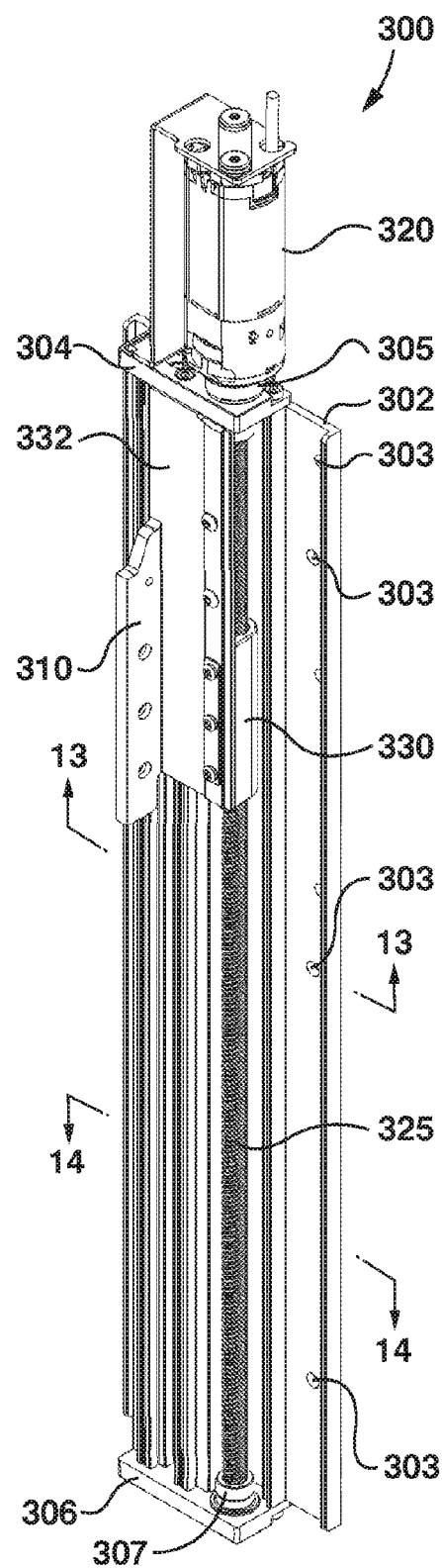
FIG. 12 is a perspective view of an exemplary linear actuator for use in a height-adjustable furniture piece.

FIG. 12 shows a linear actuator, referred to generally as 300, which may be used to raise and lower workstation 100, or another height-adjustable furniture piece.

Actuator 300 includes a frame base 302, and first and second end flanges 304, 306, extending from the first and second ends, respectively, of frame base 302. A threaded shaft 325 is rollingly supported at first and second ends of the actuator frame by bearings 305, 307, respectively. A ballscrew 330 is mounted on shaft 325. Ballscrew can be translated between the first and second ends of the actuator frame by rotating threaded shaft 325; rotating shaft 325 in one direction advances ballscrew 330 towards the first end, and rotating shaft 325 in the other direction advances ballscrew 330 towards the second end.

Ballscrew 330 is secured to a sled 332, so that translation of the ballscrew 330 results in translation of the sled 332.

Sled 332 includes a mounting flange 310 that extends away from the actuator frame base 302. Accordingly, when the actuator frame base 302 is secured to a first object (e.g. via mechanical fasteners positioned through frame base bores 303), and the mounting flange 310 is secured to a second object, rotation of shaft 325 by motor 320 will urge the first and second objects to translate relative to each other in a direction parallel to shaft 325.

For example, as discussed above, when the actuator frame base 302 is secured to display frame 120 of workstation 100, and the mounting flange 310 is secured to a wall (e.g. via wall mounting bracket 140), rotation of shaft 325 by motor 320 will assist (along with the leg actuator) in raising and lowering workstation 100.

Figure 13:
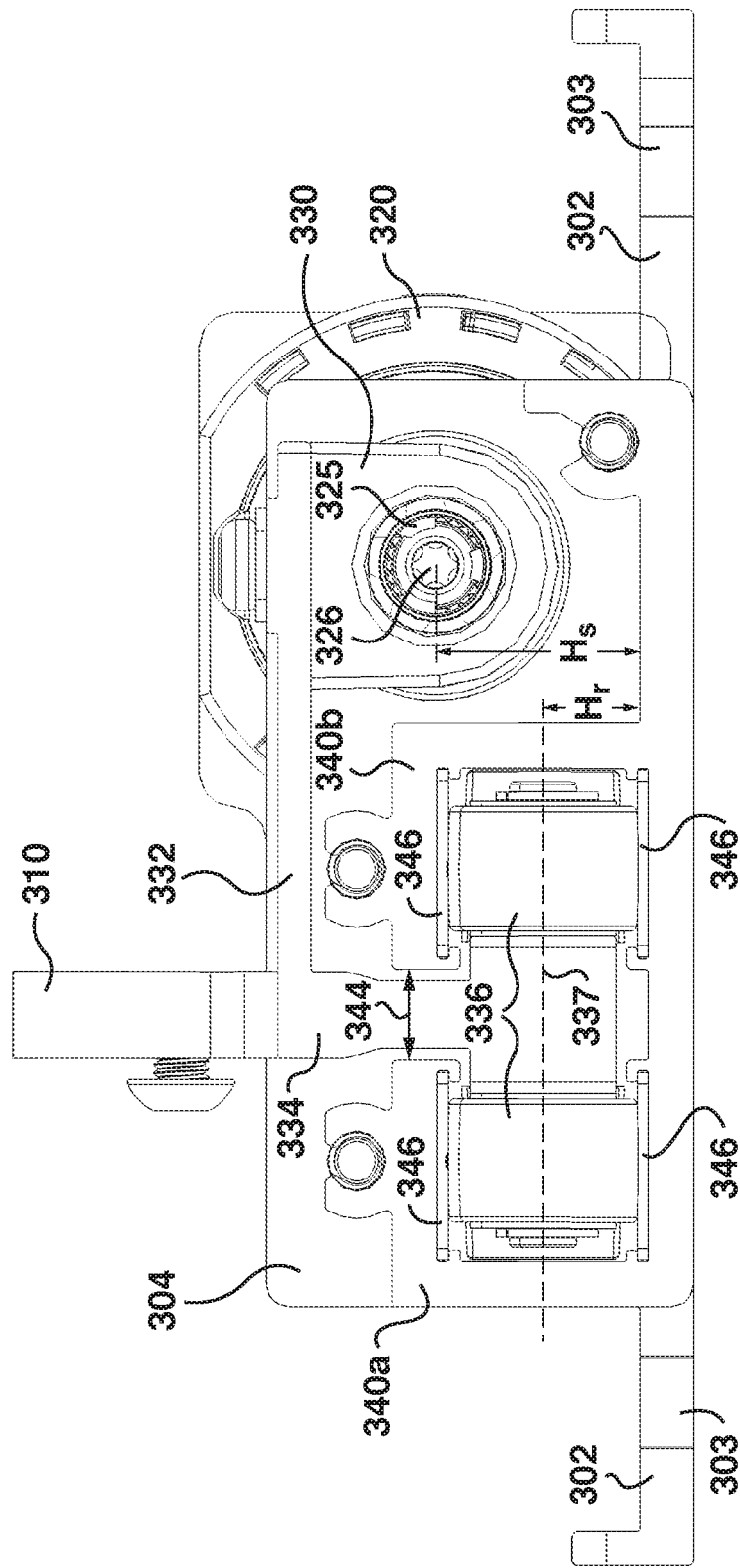
FIG. 13 is cross-section view along the line 13-13 shown in FIG. 12.
Figure 14:
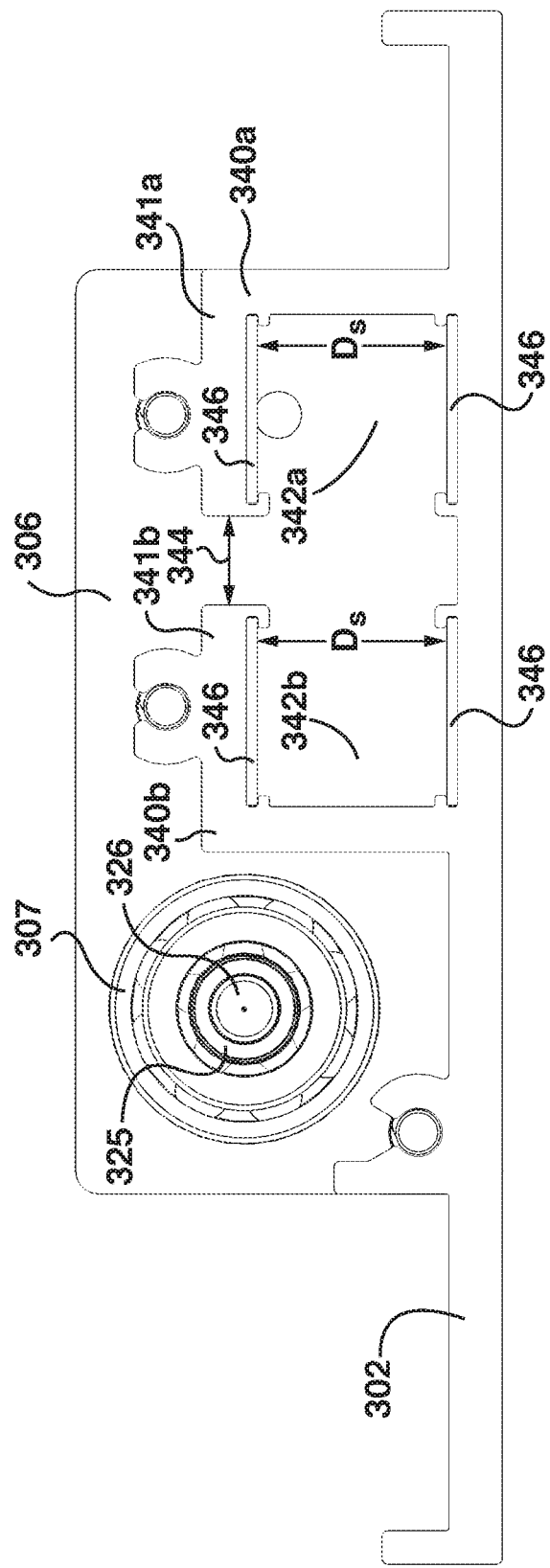
FIG. 14 is cross-section view along the line 14-14 shown in FIG. 12.

With reference to FIGS. 13 and 14, actuator 300 also includes a track extending between the first and second end of the actuator frame. The track is offset laterally from rotating shaft 325, and in the illustrated example the track includes a first L-shaped flange 340a and a second L-shaped flange 340b. Each flange 340a,b defines a channel 342a,b that extends along the actuator frame base and is bounded by the frame base 302 and a portion of the flange 341 that extends parallel to the frame base.

Flange portions 341a,b, also define a sled gap 344 between them. As shown in FIG. 13, sled 332 also includes a roller flange 334 dimensioned to fit within the sled gap. Roller flange 334 also supports a plurality of roller members 336 that extend outwardly from either side of flange 334. Roller members 336 are dimensioned to fit within the channels 342a,b, allowing sled 332 to be rollingly guided along the track by roller members 336. An optional liner surface 346 is shown positioned in the channels 342a,b to facilitate rotation of roller members 336 and/or to reduce wear. Liner surface 346 may be made of any suitable material, such as steel, plastic, and the like.

Notably, as shown in FIG. 13, the rotational axes 337 of the roller members 336 are positioned closer (distance HO to the frame base 302 than the axis of rotation 326 of the rotating shaft 325 (distance $H_s$). One advantage of this design is that it may allow actuator 300 to have a relatively low profile height.

Figure 15:
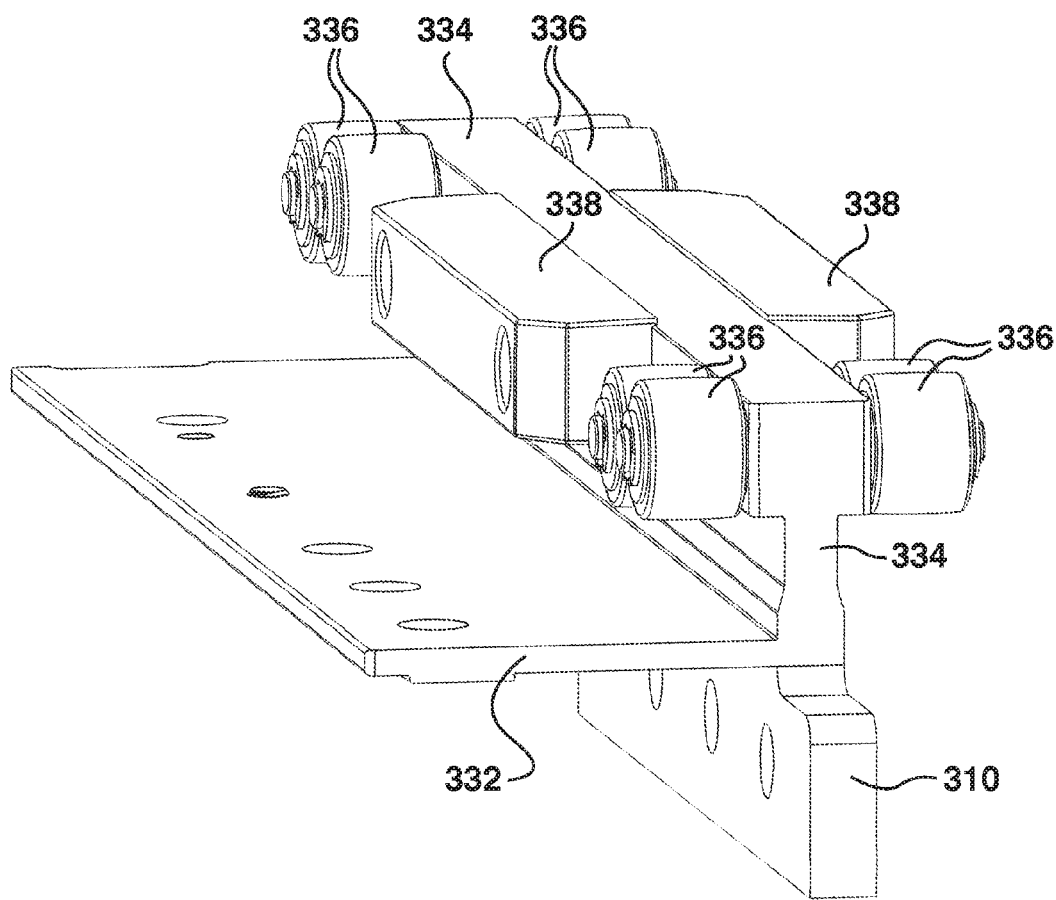
FIG. 15 is a perspective view of an actuator sled.

As shown in FIG. 15, in addition to roller members 336, one or more slider members 338 may optionally extend from roller flange 334. Slider members 338 may assist in guiding sled 332 in the track, and/or assist in opposing a force exerted on sled 332 (e.g. via mounting flange 310) in a direction away from (or towards) frame base 302.

Figures 16A, 16B:
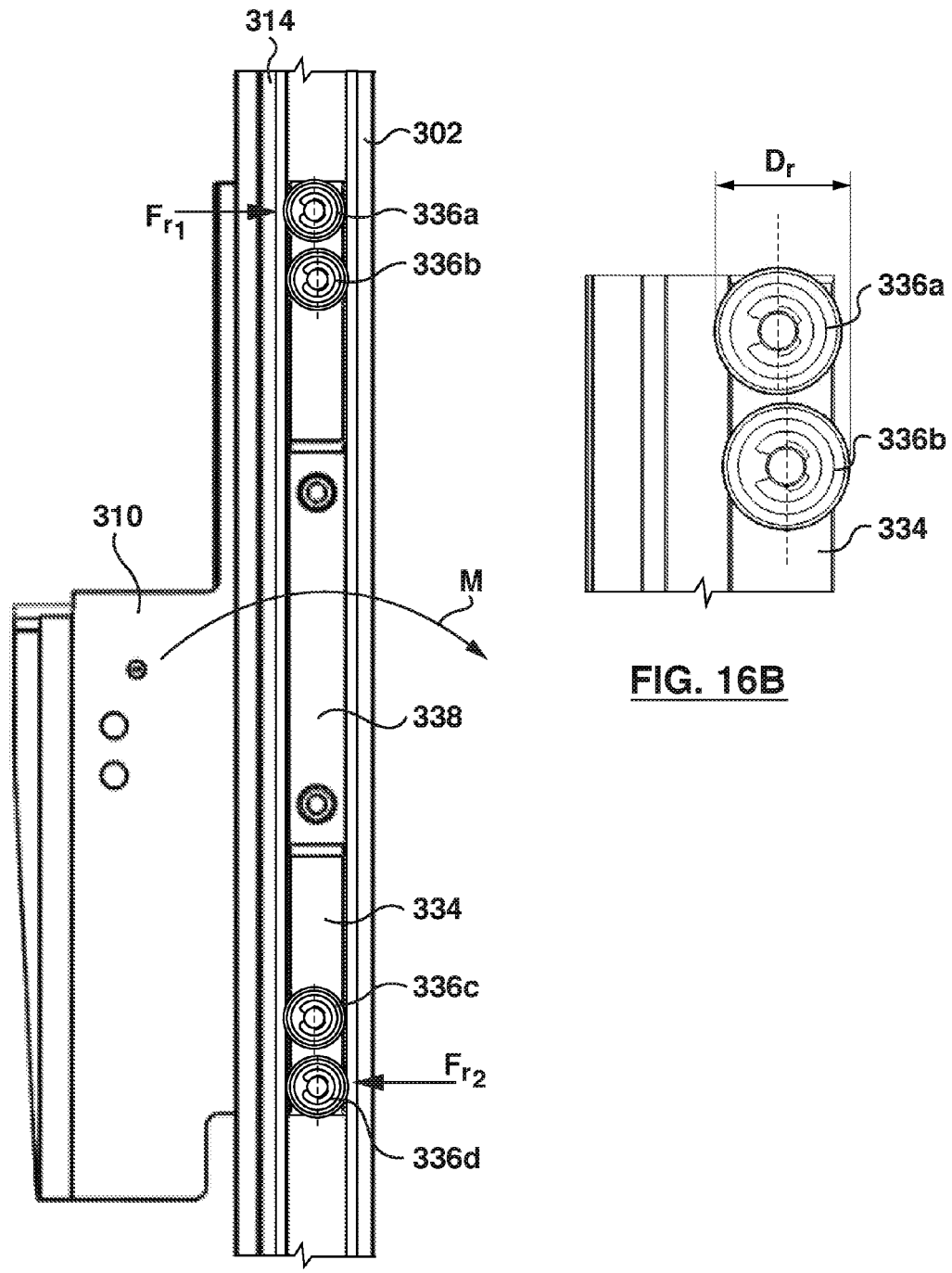
FIG. 16A is a cross-section view of an actuator sled positioned in a track.
FIG. 16B is a side view of an end of an actuator sled.

As shown in FIG. 16A, pairs of roller members 336 are provided at each end of roller flange 334. Preferably, as shown in FIG. 16B, the axes of each pair of roller member are offset from each other, so that the total distance between opposite tangent faces of the rollers $D_r$ is greater than the diameter of each of the roller members 336. Also, the height of the channels 342 (shown as $D_s$ in FIG. 14) is preferably less than the total roller height $D_r$. In other words, the liner surfaces 346 of channels 342 are dimensioned to form an interference fit (e.g. of about 0.2 mm) with the pairs of roller members at each end of the roller flange 334. Thus, when both sets of roller members (e.g. 336a,b and 336c,d as shown in FIG. 16A) are inserted into the track, a bending stress is induced into the body of the sled 332. Such an internal bending stress may promote smooth travel of the sled within the track, and/or may reduce or eliminate any play or 'slop' in the actuator.

Also, as shown in FIG. 16A, the pairs of roller members 336a,b and 336c,d are preferably offset in the same direction, and preferably offset so that the outermost roller members (i.e. roller members 336a and 336d) are positioned to counteract an expected moment (indicated as M) on the actuator. For example, when installed in a furniture piece 100 as shown in FIGS. 3 to 5, a downward force on worksurface 110 between the display frame 120 and the leg 150 will impart a bending moment M on actuator 300 (as mounting flange 310 is secured to wall 10). Thus, arranging the roller members 336 as shown in FIG. 16A provides the greatest distance between reaction forces $F_{r1}$ and $F_{r2}$, which may promote smooth travel of the sled within the track, and/or may reduce or eliminate any play or 'slop' in the actuator.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A height-adjustable furniture piece for installation to an interior wall, the height-adjustable furniture piece comprising:
a wall mounting plate configured to be removably secured to the interior wall;
a display frame;
a first actuator secured to the wall mounting plate and to a wall-facing surface of the display frame;
a display mount secured to a room-facing surface of the display frame;
a worksurface secured to and extending outwardly from a lower portion of the display frame; and
a height-adjustable leg secured to the worksurface for supporting the furniture piece on a floor surface, the height-adjustable leg comprising a second actuator;
wherein the first actuator and the second actuator are adapted to operate to raise and lower the display frame and the worksurface relative to the floor surface, and
wherein the first actuator comprises a spaced-apart pair of actuators arranged in parallel, and
wherein each of the pair of actuators comprises a linear actuator comprising:
an actuator frame having a frame base, a first end and a second end, and a track extending between the first end and the second end;
a threaded shaft extending between and rotationally supported at the first and second ends, the threaded shaft being offset to one side of the track and being substantially parallel to the track, the threaded shaft having an axis of rotation;
a sled configured to translate along and be guided by the track, the sled having a mounting flange extending away from the frame base, and a plurality of roller members for rollingly supporting the sled in the track, each roller member having an axis of rotation;
wherein the axes of rotation of the roller members are offset from the frame base by a first distance, the axis of rotation of the threaded shaft is offset from the frame base by a second distance, and the second distance is greater than the first distance;
a ballscrew mounted on the threaded shaft and secured to the sled, whereby rotation of the threaded shaft in a first direction results in the ballscrew and sled translating towards the first end, and rotation of the threaded shaft in a second direction results in the ballscrew and sled translating towards the second end; and
a motor secured to the first end and configured to selectively rotate the threaded shaft.

2. The height-adjustable furniture piece of claim 1, wherein the interior wall has at least two studs and a finished surface, the wall mounting plate has a plurality of fastener bores therein, and the wall mounting plate is configured to be secured to the at least two studs by inserting fasteners through the fastener bores;
wherein a portion of the wall mounting plate is the only element of the furniture piece that extends through the finished surface of the interior wall.

3. The height-adjustable furniture piece of claim 1, further comprising a panel having at least one input device operable to selectively operate the first actuator and the second actuator in response to a received input.

4. The height-adjustable furniture piece of claim 3, wherein the panel is located proximate the lower portion of the display frame.

5. The height-adjustable furniture piece of claim 4, wherein the panel further comprises at least one electrical input socket and at least one electrical output socket.

6. The height-adjustable furniture piece of claim 1, wherein the display mount is configured to be secured to and support a display in a plurality of orientations.

7. The height-adjustable furniture piece of claim 1, wherein the display mount comprises:
a rear panel configured to be secured to a mounting surface, the rear panel having a pair of spaced-apart sides;
a pair of rear side panels, each rear side panel having first and second spaced-apart sides, the first side of one of the rear side panels being pivotally coupled to one of the sides of the rear panel, the first side of the other rear side panel being pivotally coupled to the other side of the rear panel;
a pair of front side panels, each front side panel having first and second spaced-apart sides, the first side of one of the front side panels being pivotally coupled to the second side of one of the rear side panels, the first side of the other front side panel being pivotally coupled to the second side of the other rear side panel; and
a front panel configured to be secured to a display, the front panel having a pair of spaced-apart sides, one of the sides of the front panel being pivotally coupled to the second side of one of the front side panels, the other side of the front panel being pivotally coupled to the second side of the other front side panel.

8. The height-adjustable furniture piece of claim 1, wherein the display mount is configured to be secured to and support a display in a plurality of orientations.

9. A height-adjustable furniture piece for installation to an interior wall, the height-adjustable furniture piece comprising:
a wall mounting plate configured to be removably secured to the interior wall;
a display frame;
a first actuator secured to the wall mounting plate and to a wall-facing surface of the display frame;
a display mount secured to a room-facing surface of the display frame;
a worksurface secured to and extending outwardly from a lower portion of the display frame; and
a height-adjustable leg secured to the worksurface for supporting the furniture piece on a floor surface, the height-adjustable leg comprising a second actuator;
wherein the first actuator and the second actuator are adapted to operate to raise and lower the display frame and the worksurface relative to the floor surface, and
wherein the display mount comprises:
a rear panel configured to be secured to a mounting surface, the rear panel having a pair of spaced-apart sides;
a pair of rear side panels, each rear side panel having first and second spaced-apart sides, the first side of one of the rear side panels being pivotally coupled to one of the sides of the rear panel, the first side of the other rear side panel being pivotally coupled to the other side of the rear panel;
a pair of front side panels, each front side panel having first and second spaced-apart sides, the first side of one of the front side panels being pivotally coupled to the second side of one of the rear side panels, the first side of the other front side panel being pivotally coupled to the second side of the other rear side panel; and
a front panel configured to be secured to a display, the front panel having a pair of spaced-apart sides, one of the sides of the front panel being pivotally coupled to the second side of one of the front side panels, the other side of the front panel being pivotally coupled to the second side of the other front side panel.

10. The height-adjustable furniture piece of claim 9, wherein the interior wall has at least two studs and a finished surface, the wall mounting plate has a plurality of fastener bores therein, and the wall mounting plate is configured to be secured to the at least two studs by inserting fasteners through the fastener bores;
wherein a portion of the wall mounting plate is the only element of the furniture piece that extends through the finished surface of the interior wall.

11. The height-adjustable furniture piece of claim 9, further comprising a panel having at least one input device operable to selectively operate the first actuator and the second actuator in response to a received input.

12. The height-adjustable furniture piece of claim 11, wherein the panel is located proximate the lower portion of the display frame.

13. The height-adjustable furniture piece of claim 12, wherein the panel further comprises at least one electrical input socket and at least one electrical output socket.

14. The height-adjustable furniture piece of claim 9, wherein the first actuator comprises a spaced-apart pair of actuators arranged in parallel.

15. The height-adjustable furniture piece of claim 14, wherein each of the pair of actuators comprises a linear actuator comprising:

an actuator frame having a frame base, a first end and a second end, and a track extending between the first end and the second end;

a threaded shaft extending between and rotationally supported at the first and second ends, the threaded shaft being offset to one side of the track and being substantially parallel to the track, the threaded shaft having an axis of rotation;

a sled configured to translate along and be guided by the track, the sled having a mounting flange extending away from the frame base, and a plurality of roller members for rollingly supporting the sled in the track, each roller member having an axis of rotation;

wherein the axes of rotation of the roller members are offset from the frame base by a first distance, the axis of rotation of the threaded shaft is offset from the frame base by a second distance, and the second distance is greater than the first distance;

a ballscrew mounted on the threaded shaft and secured to the sled, whereby rotation of the threaded shaft in a first direction results in the ballscrew and sled translating towards the first end, and rotation of the threaded shaft in a second direction results in the ballscrew and sled translating towards the second end; and a motor secured to the first end and configured to selectively rotate the threaded shaft.

\* \* \* \* \*

UNITED STATES PATENT AND TRADEMARK OFFICE
CERTIFICATE OF CORRECTION

PATENT NO. : 9,879,435 B2
APPLICATION NO. : 15/177694
DATED : January 30, 2018
INVENTOR(S) : Paul Fredrick Kruger and Adam Douglas Haworth Sinclair It is certified that error appears in the above-identified patent and that said Letters Patent is hereby corrected as shown below:

In the Claims

In Column 13, Lines 27-29 Claim 16, "The height-adjustable furniture piece of claim 9, wherein the display mount is configured to be secured to and support a display in a plurality of orientations" should be added.

Signed and Sealed this
Twenty-second Day of August, 2023

*Katherine Kelly Vidal*

Katherine Kelly Vidal
*Director of the United States Patent and Trademark Office*